May 14, 1940.　　　　　J. A. JOHNSON　　　　　2,200,844
APPARATUS FOR ASSEMBLING SEALING PADS IN RECEPTACLE CLOSURE CAPS
Filed July 6, 1937　　　　5 Sheets-Sheet 1

Fig-1

INVENTOR.
J. A. Johnson
BY John A. Seifert
ATTORNEY.

May 14, 1940.   J. A. JOHNSON   2,200,844
APPARATUS FOR ASSEMBLING SEALING PADS IN RECEPTACLE CLOSURE CAPS
Filed July 6, 1937   5 Sheets-Sheet 3

INVENTOR.
J. A. Johnson
BY John A. Seifert
ATTORNEY.

May 14, 1940.   J. A. JOHNSON   2,200,844
APPARATUS FOR ASSEMBLING SEALING PADS IN RECEPTACLE CLOSURE CAPS
Filed July 6, 1937   5 Sheets-Sheet 4

INVENTOR.
J. A. Johnson
BY John A. Seifert
ATTORNEY.

May 14, 1940. J. A. JOHNSON 2,200,844
APPARATUS FOR ASSEMBLING SEALING PADS IN RECEPTACLE CLOSURE CAPS
Filed July 6, 1937 5 Sheets-Sheet 5

INVENTOR.
J. A. Johnson
BY John A. Seifert
ATTORNEY.

Patented May 14, 1940

2,200,844

UNITED STATES PATENT OFFICE 2,200,844

APPARATUS FOR ASSEMBLING SEALING PADS IN RECEPTACLE CLOSURE CAPS

John A. Johnson, Woodhaven, N. Y.

Application July 6, 1937, Serial No. 152,035

15 Claims. (Cl. 113—80)

This invention relates to apparatus for assembling sealing pads in the form of disks of cork, cork compositions or other suitable material, such as paper, in receptacle closure caps, particularly of the type known as "crown caps," wherein the sealing pads are adhesively secured in the closure caps under heat and pressure.

It is the principal object of this invention to provide apparatus of this character which will efficiently assemble sealing pads in closure caps with a considerable less number of operative parts than has been deemed possible heretofore.

In the present commercial type of apparatus for assembling sealing pads in closure caps, it has been the common practice to provide a carrier or conveyer for closure caps and separate means for transporting and positioning sealing pads in superposed alinement with the closure caps on the conveyer therefor. It is another object of the invention to provide a single carrier or conveyer for closure caps and sealing pads, thereby eliminating the separate means for transporting the sealing pads now deemed essential in the apparatus now in commercial use and permitting the feeding and engaging of sealing pads on the conveyer simply by gravity from a supply tube which will eliminate the use of means for feeding and positioning sealing pads from the supply tube to the separate sealing pad transporting means.

It is a further object of the invention to provide means for depositing adhesive in closure caps prior to the engagement of sealing pads therein wherein the supply of adhesive is shut off from the depositing means when the apparatus is stopped.

It is a further object of the invention to maintain the sealing pads separate from the closure caps until the sealing pads and closure caps are positioned relative to means to assemble the sealing pads in the closure caps in contact with the adhesive in the closure caps.

Further objects and advantages of the invention will be more fully described hereinafter.

The embodiment of the present invention comprises a continuously traveling conveyer arranged with a series of closure cap supporting seats and a series of sealing pad supporting seats in superposed alinement with the closure cap supporting seats, and said conveyer being actuated to position said closure cap supporting seats successively relative to means to feed and engage closure caps therein, means to deposit and spread adhesive in the closure caps supported by the seats therefor, and means to heat the closure caps and render the adhesive therein viscous, and subsequently to the heating of the closure caps, position the sealing pad supporting seats relative to the lower or delivery end of a supply tube leading from a hopper for sealing pads. The portion of the conveyer having heated closure caps with viscous adhesive therein and sealing pads in the seats therefor is positioned relative to a continuously traveling table having a series of pressure applying plungers adapted to be actuated from the table to permit the portion of the conveyer with the alined closure caps and sealing pads to intersect a peripheral portion of the table and actuated toward the table to assemble the sealing pads in the alined closure caps, transfer the assembled closure caps from the conveyer to the table and place the sealing pads under heat and pressure to effect an intimate adhesion between the sealing pads and closure caps. To prevent a waste of adhesive and the cluttering of the conveyer with adhesive when the travel of the conveyer is stopped, the supply of adhesive is shut off and the means for depositing adhesive in the closure caps is held in inoperative position by means actuated by means controlling the actuation of the conveyer. The sealing pads are normally retained in the supply tube by means adapted to be actuated to permit the discharge of sealing pads into the seats therefor of the conveyer by the travel of closure caps on the conveyer past the supply tube. Means are provided to position the sealing pads fully in the seats therefor in alinement with the closure caps on the conveyer and retain the sealing pads in said seats separate from the closure caps on the conveyer until the conveyer intersects the table.

In the drawings accompanying and forming a part of this application.

In carrying out the embodiment of the invention illustrated in the accompanying drawings, the operative mechanisms are supported on a table T mounted at opposite end portions on standards S, and said mechanisms are actuated by a drive shaft 13 rotatably mounted to extend parallelly of the end portions of the table T in bearings arranged on a standard of a pair of standards S' mounted on the end portions of the table T. The drive shaft 13 is adapted to be operatively connected to and disconnected from a source of power, such as an electric motor, not shown, through a clutch mechanism operative between said drive shaft and a pulley wheel loosely mounted on the shaft and connected to the electric motor by a belt, the pulley wheel being partially shown at 14 in Figure 1. The clutch is not shown in the drawings as it does not form a part of this invention and it is clearly shown in my copending application Serial No. 132,728, filed March 24, 1937, now Patent Number 2,138,923. The clutch mechanism is actuated in the present apparatus in a manner similar to the disclosure in my co-pending application Serial No. 132,728, by hand grips and handles 15 fixed at convenient points on a shaft 16 rotatably supported in bearings 17 mounted on the table T, as shown in Figure 2.

Figures 10, 11, 12:
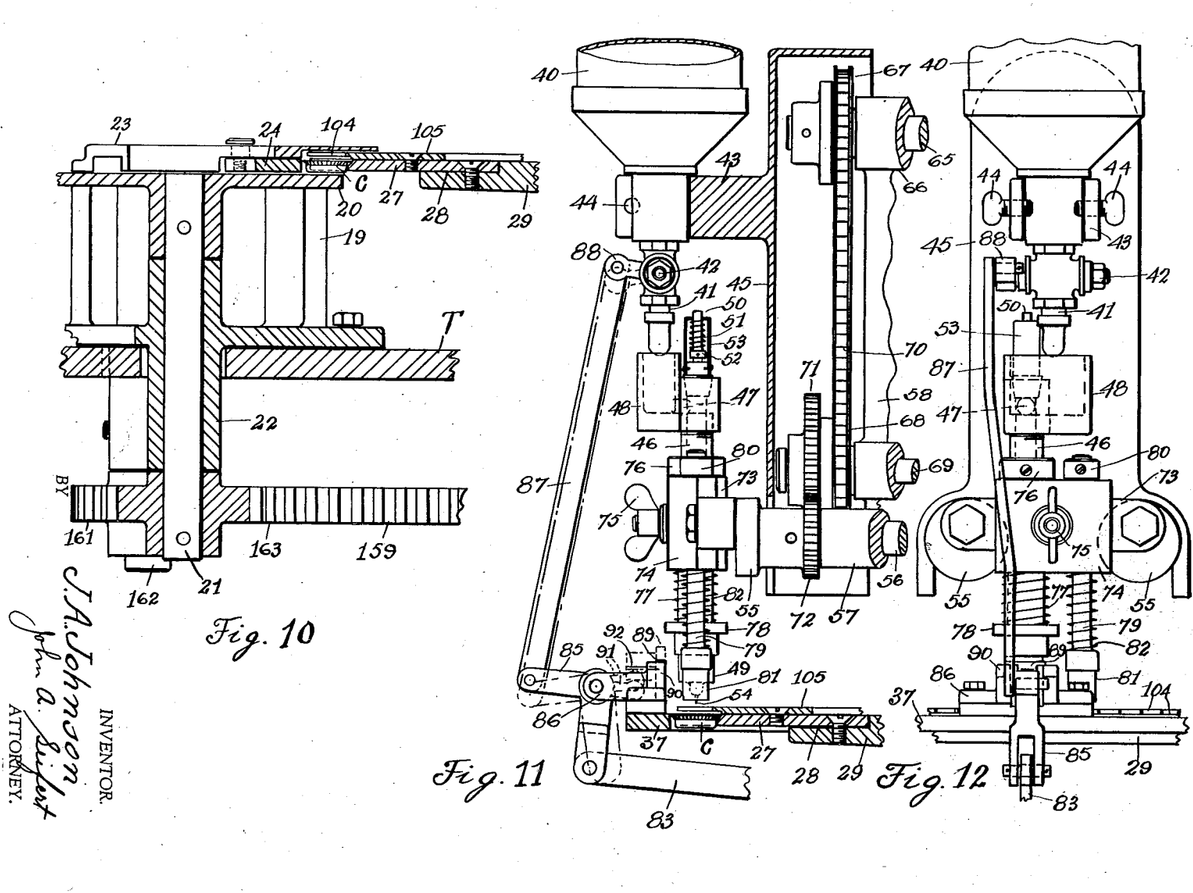
Figure 10 is a sectional view, on an enlarged scale, taken on the line 10—10 of Figure 2 looking in the direction of the arrows and showing the means to feed and engage closure caps in the supporting seats therefor of the conveyer.
Figure 11 is an elevational view partly in section of the means for depositing and spreading adhesive in the closure caps in the seats therefor of the conveyer.
Figure 12 is a view looking at the left of Figure 11.

Closure caps C of the crown type having outwardly flaring skirt portions, are delivered to the apparatus from a hopper, not shown, by a chute 18 of channel shape in cross section with the lower or discharge end portion supported from the table T by a bracket 19 mounted on the table T. The discharge end portion of the chute extends in a substantially horizontal plane over a peripheral portion of a disk 20 fixed on one end of a shaft 21 rotatably mounted in a boss 22 forming an integral part of the bracket 19 and extending perpendicularly to the table T with a portion of said boss extending through and below said table, as shown in Figure 10. The closure caps are continuously discharged from the chute by the continuous rotation of the disk 20 in a direction away from the chute, as indicated by the arrow in Figure 2, and guided in a single path along the periphery of the disk by a channel member 23 mounted on the bracket 19 in opposed relation to the closure cap supporting face of the disk 20 and extending from the chute 18 along a peripheral portion of said disk. The closure caps being transported by the disk 20 in the channel member 23, are moved or ejected from the disk by an arm 24 pivotally mounted on the bottom portion of the channel member in line with the inner side wall of the channel member, and said arm being yieldingly urged toward the periphery of the disk 20 to engage and move the closure caps in the channel member from said member and disk by a spring 25 fixed at one end to the upper surface of the channel member and the opposite end fixed to the free end portion of the arm, as shown in Figure 2.

Figure 1:
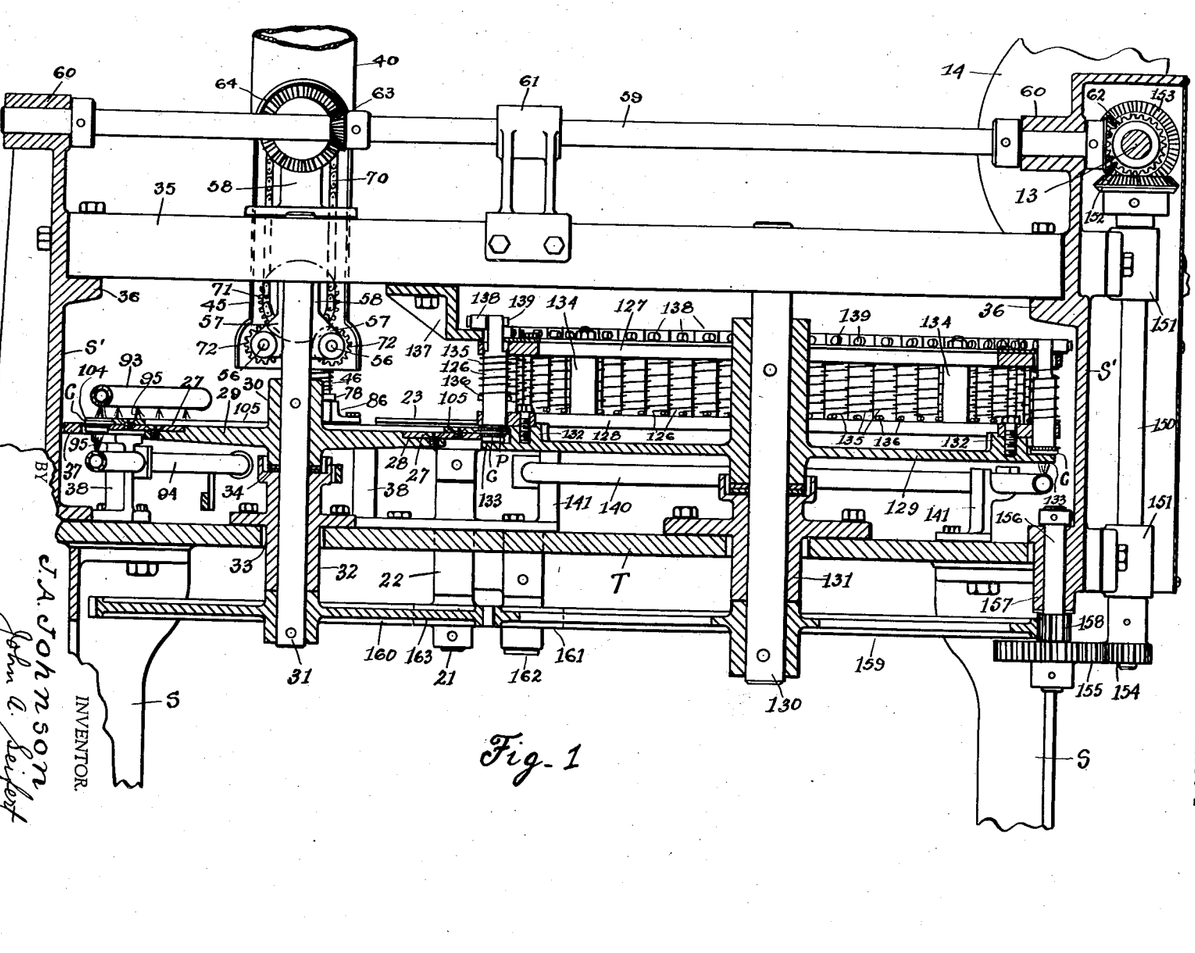
Figure 1 is a side elevational view in section of the apparatus forming the embodiment of this invention.
Figure 2:
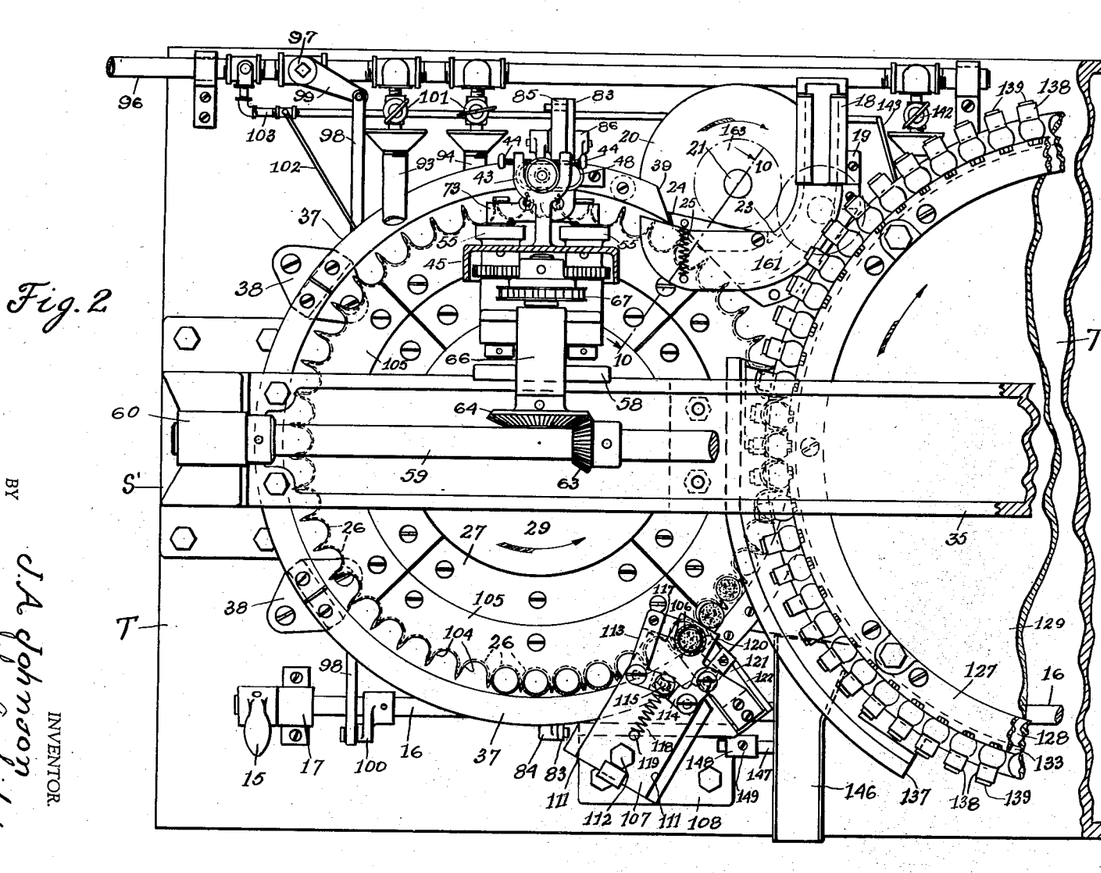
Figure 2 is a view looking at the top of the apparatus with an end portion thereof broken away.

The closure caps are moved by the arm 24 under the force of spring 25 into supporting seats of a continuously traveling carrier or conveyer comprising arcuate recesses 26 arranged in equidistantly spaced relation to each other in the periphery of arcuate segments 27, as shown in Figure 2, of a number to form a complete ring with a continuous series of closure cap supporting seats 26, or the seats 26 may be in the periphery of an annular member, mounted in a recess 28 in the peripheral portion of a circular table 29. The table 29 is rotatably mounted to position the closure cap supporting seats 26 between the disk 20 and a portion of the channel member 23 extending beyond the periphery of the disk 20, as shown in Figures 2 and 10. This is accomplished by arranging the table 29 with a hub 30 extending from the faces of the table and adapted to be fixed on a shaft 31 rotatably mounted at the lower end portion in a bearing 32 supported in an opening in the table T on the longitudinal axis thereof, as at 33, in Figure 1, the upper end of said bearing being recessed to rotatably support the lower end portiton of the hub 30 with anti-frictiton means interposed between the hub and bearing, as at 34 in Figure 1. The upper end portion of the shaft 31 is rotatably supported in a beam 35 mounted at the opposite ends on flanges extended inwardly from the standards S', as at 36.

The closure caps are retained in the seats 26 during the continuous travel of the table 29 by a rail 37 supported from the table T by brackets 38 to extend around the table 29 in the plane of and spaced from the seats 26 to prevent movement of the closure caps from the seats in a lateral direction. One end of the rail terminates over a peripheral portion of the disk 20 and is shaped to form an abutment stop for the feeding arm 24 and limit the movement of said arm toward the seats 26, as at 39 in Figure 2. The portion of the channel member 23 which extends beyond the periphery of the disk 20 extends over the seats 26 of the portiton of the table 29 traveling relative to the disk 20, so that the closure caps will be positioned in the seats 26 by the arm 24 in flat condition.

The closure caps C engaged in the seats 26 of the table 29 are conveyed by the rotation of said table from the disk 20 past means disposed above and relative to the travel of the closure caps adapted to deposit and spread liquid adhesive in said closure caps during the continuous travel of the table 29. Said adhesive depositing and spreading means comprises a container 40 for adhesive having a conical bottom arranged with a discharge outlet nozzle portion 41 having a flow controlling valve mounted therein, as indicated in a general way at 42. The container is releasably mounted in a bifurcated portion of a bracket 43 by a pair of clamping screws adjustably mounted in the bifurcation legs to engage a cylindrical portion of the conical bottom of the container, as at 44 in Figures 11 and 12. The bracket 43 is integral with and extends laterally from a box shaped shield 45 supported by the beam 35. The adhesive is delivered from the container to the closure caps in the seats 26 by a tubular member having an inlet opening 47 in the wall thereof adjacent the upper end thereof adapted to receive adhesive from the outlet 41 of the container through a rectangular receptacle 48 mounted on the upper end of the tubular member in vertical alinement with and below the outlet 41 to receive adhesive therefrom and having an outlet passage communicating with the inlet 47 of the tubular member. The lower end of the tubular member is arranged with an outlet or discharge nozzle 49 normally closed by a valve in the form of a rod 50 slidably mounted centrally in the tubular member with the lower end yieldingly engaging the discharge outlet of the nozzle 49 of the tubular member under the influence of a spring 51 coiled around the upper end of the valve rod 50 extending above the tubular member and compressed between a collar 52 fixed on the valve rod and a cap 53 mounted on the upper end of the tubular member 46, as shown in Figure 11. The lower end of the valve rod 50 is arranged with a needle projection extending through the discharge outlet of the nozzle 49 of the tubular member, as shown at 54 in Figure 11, to engage a closure cap on the table 29 and move the valve rod in an upward direction out of closing position against the force of the spring 51 to permit discharge of a spot of adhesive in the closure cap engaged by the needle projection 54.

To permit the depositing of a spot of adhesive in the closure caps in the seats 26 without interrupting the continuous travel of the closure caps, the tubular member 46 is mounted to have rotary movement in a vertical plane between the adhesive receptacle 40 and the closure caps in the seats 26 by a pair of wheels 55 mounted on shafts 56 rotatably supported in bearings of diverging arms 57 of a bracket 58 mounted on the beam 35 and adapted to support the shield 45. The shafts 56 are continuously rotated from the drive shaft 13 through a shaft 59 rotatably supported at the opposite ends in bearings 60 of the standards S' and at an intermediate portion in a bearing 61 mounted on the beam 35, as shown in Figure 1. One end of the shaft 59 is operatively connected to the drive shaft 13 by bevelled gearing 62 and the shaft 59 is operatively connected to the shafts 56 by a bevelled pinion 63 fixed on the shaft 59 meshing with a bevelled gear 64 fixed on one end of a shaft 65 rotatably mounted in a bearing 66 of the bracket 58. A sprocket wheel 67 is fixed on the opposite end of said shaft 65 and operatively connected to a sprocket wheel 68 fixed on a stud shaft 69 rotatably mounted in a bearing at the fork of the diverging arms 57 by a sprocket chain 70 engaged around the sprocket wheels 67, 68. A gear 71 is mounted on the shaft 69 adjacent the sprocket wheel 68 meshing with gears 72 fixed on the shafts 56, whereby continuous rotation is imparted to the wheels 55. The tubular member 46 is mounted on the wheels 55 by a carrier 73 rotatably connected at the opposite sides to the wheels 55 and having an arcuate recess for the mounting of the tubular member thereon. The tubular member 46 is slidably mounted in said arcuate recess of the carrier 73 by a plate 74 releasably secured to the carrier by a stud fixed in the carrier to be engaged in an opening in the plate and a wing nut engaged on the projecting end of the stud, as at 75 in Figures 11 and 12. Sliding movement of the tubular member 46 in the carrier 73 in a downward direction is limited by a collar 76 fixed on the tubular member to engage the upper edge of the carrier 73 and the tubular member is yieldingly positioned with the collar abutting the carrier by a spring 77 coiled around the tubular member between the lower edge of the carrier 73 and a shoulder 78 on the tubular member above the discharge nozzle 49 thereof. The spring 77 will normally position the tubular member with the collar 76 abutting the carrier 73 but will permit the tubular member to have movement independently of the carrier, as will be more fully described hereinafter. The shield 45 is arranged to enclose the sprocket wheels 67, 68, sprocket chain 70, and the gears 71, 72, as shown in Figure 11. The receptacle 48 is of such length to assure positioning a portion thereof directly below the discharge outlet 41 of the container 40 to receive adhesive from the container and prevent the adhesive spilling on the apparatus in all of the positions of the tubular member 46.

The spots of adhesive deposited in the closure caps in the seats 26 by the engagement of the needle projection 54 in said closure caps during the movement of the tubular member 46 toward the closure caps, are spread subsequently to the depositing thereof by a spreader in the form of a plunger 79 slidably mounted in the carrier 73 and retained therein by a collar 80 fixed on the upper end portion of the plunger to abut the upper edge of the carrier. The lower end of the plunger 79 is arranged with a head 81 of resilient material, such as rubber, and said head is yieldingly positioned to engage and spread the adhesive during the downward movement of the carrier 73 by a spring 82 coiled around the plunger between the carrier and the head, the force of the spring yieldingly abutting the collar 80 against the carrier. The springs 77 and 82 are of such strength to permit movement of the tubular member 46 and the plunger 79 away from the closure caps should the movement of the carrier 73 be greater than it is necessary to properly position the needle projection 54 and spreader head 81 in the closure caps, and thereby, prevent the forcing of the closure caps through their seats 26.

To prevent the flow of adhesive from the container 40 to the receptacle 48 with the resulting overflowing of the receptacle when the apparatus is stopped by the actuation of the hand grip 15 to disconnect the driving wheel 14 from the drive shaft 13, the valve 42 is actuated to shut off the discharge of adhesive from the container through the outlet 41. This is accomplished by a bar 83 pivotally connected at one end to an arm 84 fixed to the shaft 16 with the opposite end of the bar pivotally connected to a bifurcated arm of a bell crank lever 85 pivotally mounted in a bifurcated extension of a bracket 86 supported on the rail 37 centrally of the vertical line of movement of the tubular member 46. The bell crank lever 85 is connected to the valve 42 by a link 87 pivotally connected at one end to the other arm of the bell crank lever with the opposite end pivotally connected to an arm 88 extending from and fixed to the valve 42, as shown in Figures 2, 11 and 12.

The apparatus may be stopped when the carrier 73 is in its lowermost position with the valve projection 54 engaging a closure cap and opening the valve which will permit the discharge of adhesive until the adhesive is exhausted from the tubular member 46 or until the apparatus is placed in operation when the needle projection 54 will be positioned out of contact with the closure cap. To prevent this waste of adhesive and the consequent cluttering of the table 29 with adhesive, the tubular member 46 is moved and maintained in elevated position against the force of the spring 77 and the downward movement of the carrier 73 by a slide block 89 slidably mounted in a slideway arranged in the bracket 86, as at 90 in Figures 11 and 12. The slide block 89 will have vertical movement in line with the shoulder 78 of the tubular member and is actuated to engage said shoulder and lift the tubular member against the force of the spring 77 by a finger 91 fixed to and extending from the bell crank lever 85 to engage a projection 92 fixed to and extended from the slide block, whereby the actuation of the bell crank lever by the handle 15 to actuate the valve 42 to closed position will actuate the slide block into engagement with the shoulder 78 and position the needle projection 54 out of engagement with the closure cap, as shown in dot and dash lines in Figure 11.

Subsequent to the depositing and spreading of adhesive in the closure caps in the seats 26 of the table 29, said closure caps are passed through a zone of elevated temperature to render the adhesive in said closure caps viscous. Said zone of elevated temperature is created by heating elements extending above and below the travel of the closure caps of any suitable form and structure and which may comprise a series of longitudinal gas burners formed by a pair of pipes 93, 94 having portions extending in an arcuate direction, with the pipe 93 in a plane above the seats 26 of the table 29 and the pipe 94 in a plane below the seats of said table, as shown in Figure 1. The pipes are arranged with a series of orifices opposed to the seats 26 to direct the gas flames toward the tops and bottoms of the closure caps, as at 95, to heat the closure caps and destroy foreign substances in the adhesive and render the adhesive viscous. The pipes 93, 94 are supported in position on the table T by the brackets 38 and are connected to a gas supply pipe 96 having a flow control valve, as indicated in a general way at 97 in Figure 2, actuated by the hand grip 15 through a rod 98 connected at one end to the valve by a link 99 and the opposite end of the rod pivotally connected to an arm 100 fixed on the shaft 16, whereby the disconnecting of the driving pulley 14 from the drive shaft 13 will shut off the gas supply from the burner pipes 93, 94 and prevent scorching of and injury to the closure caps. The supply of the gas may be manually regulated to each of the pipes 93, 94 by valves in said pipes, as indicated at 101 in Figure 2. The gas in the pipes 93, 94 is automatically ignited by a pilot light supplied by a pipe 102 connected to a supply pipe 103 connected to the main supply pipe 96, as shown in Figure 2.

The burner pipes 93, 94 extend from a point in the travel of the closure caps subsequent to the adhesive spreader plunger 79 to a point preceding means for assembling sealing pads P in the closure caps, so that the adhesive in said closure caps is rendered fully viscous and tacky to assure an adhesion between the sealing pads and closure caps when the sealing pads are engaged in the closure caps in contact with the adhesive therein.

The principal feature of the embodiment of the present invention is the arranging of the closure cap conveying table 29 to support and convey sealing pads P in alined and spaced relation above the closure caps in the seats 26. This is accomplished by providing said table with a series of sealing pad engaging portions comprising arcuate recesses 104 arranged in equidistantly spaced relation to each other in the periphery of arcuate segments 105, corresponding to and mounted on the segments 27 with the recesses 104 in vertical spaced alinement with the recesses 26 in the segments 27. The recesses 104 may be in the periphery of an annular member instead of a series of segments forming a continuous series of recesses 104. The recesses 104 have a radius slightly less than the radius of the recesses 26, as the sealing pads are of less diameter than the closure caps, as shown in Figure 2.

Figures 3, 4:
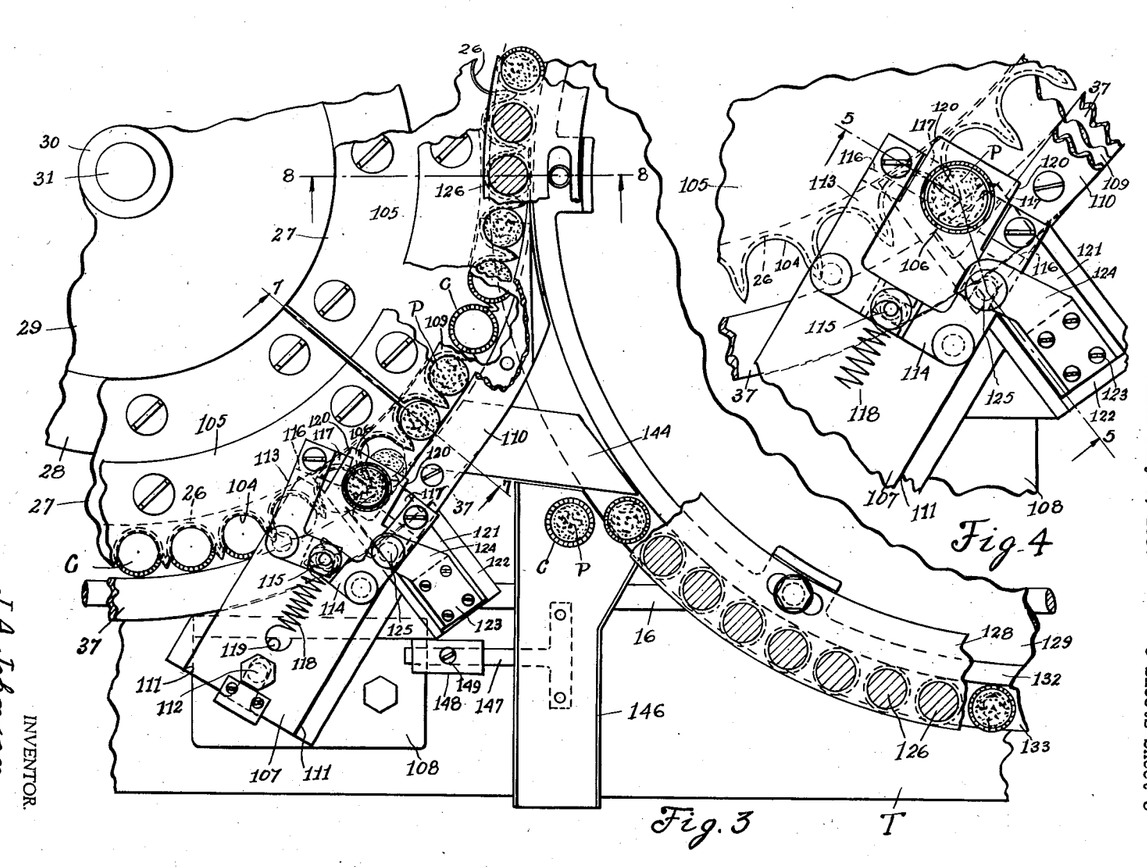
Figure 3 is a view of a portion of the conveyer relative to which the supply tube for sealing pads and the means for controlling the discharge of the sealing pads from the tube are mounted, and showing said controlling means actuated by closure caps to permit the discharge of sealing pads from the tube into supporting seats therefor of the conveyer.
Figure 4 is a view, on an enlarged scale, of the sealing pad supply tube and discharge control means therefor with said control means in normal position retaining the sealing pads in the supply tube.
Figures 5, 6, 7, 8, 9:
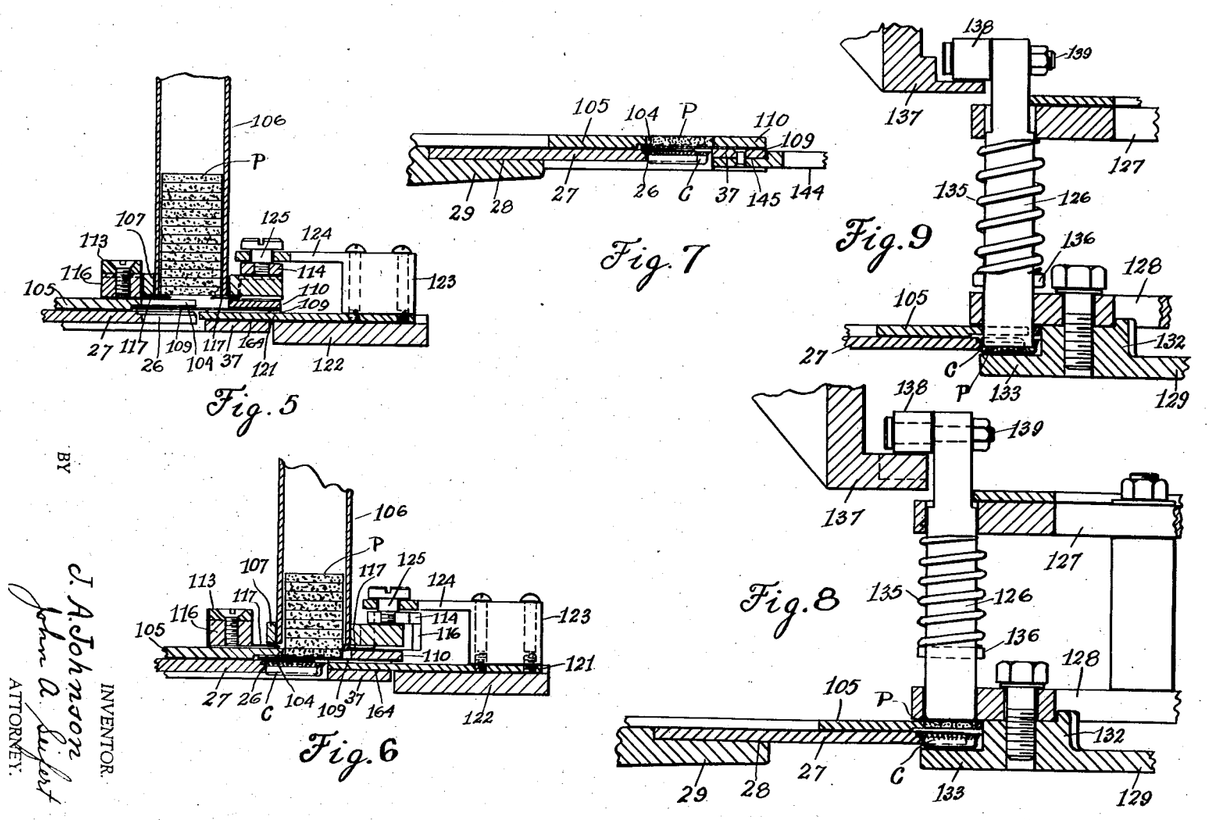
Figure 5 is a sectional view taken on the line 5—5 of Figure 4 looking in the direction of the arrows.
Figure 6 is a view similar to Figure 5 but showing the means for controlling the delivery of sealing pads from the supply tube actuated by closure caps out of normal position to permit discharge of sealing pads from the supply tube.
Figure 7 is a fragmentary sectional view, on an enlarged scale, taken on the line 7—7 of Figure 3 looking in the direction of the arrows, and showing means for separating the sealing pads from the closure caps and alining the sealing pads with the closure caps.
Figure 8 is a sectional view, on an enlarged scale, taken on the line 8—8 of Figure 3 looking in the direction of the arrows, and showing a sealing pad in alinement with a closure cap and pressure applying plunger in position to permit the intersecting of the conveyer with a portion of the plunger carrying table.
Figure 9 is a view similar to Figure 8 taken substantially on the line 8—8 of Figure 3, and showing the plunger actuated to engage the sealing pad in the closure cap and impinge the assembled cap against the table.

The sealing pads P are of resilient material, such as composition cork, cork or paper, formed to disk shape and supported in stack formation adjacent the travel of the sealing pad recesses 104 by a tube 106 of slightly greater diameter than the sealing pads, leading from a hopper, not shown, and supported at the lower end in an opening in an end portion of a plate 107 mounted on a bracket 108 supported on the table T adjacent a peripheral portion of the table 29. The plate 107 is mounted on the bracket 108 with the end portion thereof arranged with the tube 106 extending above and parallelly to the recesses 104, so that the lowermost sealing pad in the tube may drop by the force of gravity onto a relatively thin plate 109 extending in a plane parallel to and between the seats 26 and recesses 104. The tube 106 is positioned relative to the line of travel of the recesses 104, so that the sealing pads will be positioned on the plate 109 to be engaged by the outer ends of the walls of the recesses 104 and moved by the travel of the table 29 along said plate 109 from the tube, whereby the succeeding sealing pad in said tube will be permitted to drop onto the plate 109 and be engaged by the wall of a succeeding recess. During the continuous travel of the table 29, the sealing pads are progressively positioned fully in the recesses 104 by a rail 110 extending in the plane of the recesses 104 and in an arc intersecting the arc of the periphery of the table 29, as clearly shown in Figure 3. The rail 110 is mounted on the rail 37 with the thin plate 109 interposed between the rails 37 and 110, as shown in Figures 4 and 7. The portion of the bracket 108 supporting the plate 107 is arranged as a slideway, as at 111, to permit adjustable positioning of the sealing pad supply tube 106 relative to the line of travel of the recesses 104, and said plate 107 is retained in adjusted position by a clamping screw threaded in the bracket and engaged in an elongated slot in the plate, as at 112, in Figure 3.

To prevent the waste of sealing pads, the sealing pads are held in the supply tube 106 in the absence of a closure cap or caps in the seats 26 traveling past the tube 106. To accomplish this purpose, the sealing pads are normally retained in the supply tube 106 by a pair of fingers comprising bell crank levers 113, 114 pivotally mounted on the plate 107 adjacent the opposite sides thereof with end portions of the levers connected to each other to permit movement of one lever being imparted to the other lever, as at 115 in Figures 2, 3 and 4, and the opposite end portions having blocks fixed to the underface thereof and adapted to carry blades 117 extending in a plane parallel to the table 29 and below the plate 107. The levers 113, 114 are pivotally mounted on opposite marginal portions of the plate 107 to permit movement of the blades 117 toward and away from the lower end of the supply tube 106, the movement of the blades toward the tube positioning the blades below and in supporting engagement with the lowermost sealing pad in said tube, as shown in Figures 4 and 5. The blades 117 are normally and yieldingly positioned to support the sealing pads in the tube and prevent discharge of the sealing pads from the tube by a spring 118 anchored at one end by a pin 119 fixed in the plate 107 and the opposite end of the spring being connected to the connection 115 of the levers 113, 114. The end portion of the plate 107 carrying the tube 106 is recessed at the corners, as at 120, to permit movement of the block ends 116 of the levers 113, 114 toward the tube 106 and the positioning of the blades 117 below the sealing pads in the tube. The walls of the recesses 120 adjacent opposite peripheral portions of the tube constitute abutments to limit the movement of the levers toward each other in conjunction with the connection 115.

The blades 117 are actuated out of their normal position of retaining the sealing pads in the supply tube by the travel of closure caps in the seats 26 past the tube 106, by a slide 121 slidably mounted in a slideway 122 supported by the bracket 108 to extend radially of the shaft 31 and in the plane of the closure cap supporting seats 26, as shown in Figures 5 and 6. The slide 121 is operatively connected to the lever 114 by a member having a block 123 at one end mounted on the outer end of the slide 121 and a lateral extension 124 having an elongated recess at the free end engaging a headed pin screw threaded in the lever 114 intermediate the pivotal mounting and the blade 117 of said lever 114, as at 125. The inner end of the slide 121 is supported and extended through a recessed portion in the upper face of the rail 37, as at 164 in Figures 5 and 6, and said inner end of the slide being yieldingly urged into the path of travel of the closure caps in the seats 26, as shown in Figures 4 and 5, by the spring 118 through the lever 114 and extension 124. The engagement of a closure cap with the inner end of the slide will move the slide in a direction from the table 29 against the force of the spring 118 and position the blades 117 out of the path of the sealing pads in the tube 106, as shown in Figures 2, 3 and 6.

When the sealing pads P in the recesses 104 are alined with the closure caps in the seats 26 by the cam rail 110, the sealing pads will leave the supporting plate 109 and be positioned by the rotation of the table 29 relative to means to remove the sealing pads from the recesses 104 and position said sealing pads in alined closure caps in the seats 26 in contact with the viscous adhesive in said closure caps. The means for assembling the sealing pads in the closure caps comprises an annular series of pressure applying plungers 126 slidably mounted in spaced and alined annular members 127, 128 supported on a table 129 mounted on a shaft 130 rotatably supported at the opposite end portions in the beam 35 and a bearing 131 supported in an opening in the table T on the longitudinal axis thereof and of a structure similar to the bearing 32 for the shaft 31 of the table 29, as shown in Figure 1. The table 129 is arranged with an annular ridge 132 adjacent the periphery thereof and arranging the peripheral portion of the table 129 with an annular shelf 133. The shaft 130 is spaced from the shaft 31 of the table 29 and the table 129 is of a diameter to position a portion of the shelf 133 below and intersecting the seats 26 and recesses 104 of a portion of the table 29. The annular member 128 is mounted on the ridge 132 and the annular member 127 is supported on the annular member 128 by posts 134, with the plungers 126 in vertical alinement with the shelf 133. The plungers 126 are yieldingly urged toward the shelf 133 by springs 135 coiled around the plungers and compressed between the annular member 127 and pins 136 engaged in the plungers to extend transversely thereof with the opposite ends of the pins projecting from the plungers. When the plungers 126 approach the point of intersection between the tables 29 and 129, they are lifted against the force of the springs 135 by a cam rail 137 mounted at one end on the beam 35 and of a curved shape along the longitudinal axis thereof to extend in juxtaposed relation to the annular member 127 for the engagement of rollers 138 rotably mounted on pins 139 fixed in and extended laterally from the outer face of the plungers 126. The cam face of the cam rail 137 is formed by varying the thickness of the roller engaging portion of the rail with the thickest portion at a point where the sealing pad and closure cap are in alinement and a thin portion immediately following said thickest portion, as clearly shown in Figures 8 and 9. The thickest or high portion of the cam rail extends from a point in advance of the point of intersection of the tables 29, 129 to said point of intersection to permit the table 29 to position the alined sealing pads and closure caps over the shelf 133, as shown in Figure 8, and immediately after said point of intersection, the thin or low portion is arranged in the cam rail, as shown in Figure 9, which will permit the plungers 126 to engage and move the sealing pads from the recesses 104 into the closure caps in seats 26 in contact with the viscous adhesive in the closure caps under the influence of the springs 135. The portions of the cam rail 137 shown in Figures 8 and 9 must be very close together to have the alined sealing pads and closure caps in alinement with the shelf 133, which position of the sealing pads and closure caps relative to the shelf is only momentary due to the continuous rotation of the tables 29 and 129. The low portion of the cam rail 137 continues to the end of the rail, so that the plungers 126 under the force of the springs 135 will maintain the sealing pads in contact with the viscous adhesive in the closure caps and the closure caps in contact with the shelf 133, the plungers being maintained in this position while they are moved away from the seats 26 in which the assembled closure caps are engaged, whereby said assembled closure caps are disengaged from said seats 26 and retained on the shelf 133 under pressure of the plungers 126 for the greater part of a revolution of the table 129.

To assure an intimate adhesion between the sealing pads and closure caps, the shelf 133 is heated for approximately half of the revolution of the table 129 extending from a point adjacent the point of intersection of the tables 29, 129, by a gas burner in the form of a perforated burner pipe 140 supported from the table T to extend below and along the shelf 133 by brackets 141 mounted on the table T, said pipe being connected to the supply pipe 96 through a valve connection, as at 142 in Figure 2. The burner 140 is automatically ignited when the apparatus is placed in operation by the opening of the valve 97 through the rod 98 by a pilot light supplied by a pipe 143 connected to the supply pipe 103.

The closure caps having intimately adhering sealing pads therein are removed from the shelf 133 at a point preceding the point of intersection of the tables 29, 129 and in line with the high portion of the cam rail 137 where the plungers 126 are actuated away from the shelf 133. This is accomplished by an abutment plate 144 fixed at one end in an undercut portion of the rail 37, as at 145 in Figure 7, with the opposite end portion extending over the shelf 133 with the edge of said end portion extending at an angle and adjacent to the ridge 132, as shown in Figure 3. The assembled closure caps engaged by the abutment plate 144 are guided by said plate from the shelf 133, onto a chute 146 mounted on the bracket 108 to have adjustment toward and away from the shelf 133 by a bar 147 fixed at one end to the underface of the chute and the opposite end portion slidably engaged in a tubular portion 148 of the bracket 108. The chute is retained in adjusted position by a set screw 149 screw threaded in the tubular portion 148 to abut the bar 147. The chute 146 declines from the shelf 133 to a point beyond the edge of the table T to deliver the assembled closure caps directly to a depository or to a belt conveyor traveling along the edge of the table T to a depository.

The closure cap feeding and delivering disk 20, and the tables 29 and 129 are continuously rotated from the drive shaft 13, the disk 20 and table 129 being rotated in a clockwise direction, and the table 29 being rotated in an anti-clockwise direction, as indicated by the arrows in Figure 2. The rotation of the drive shaft 13 is transmitted to the table 129 through a shaft 150 rotatably supported in alined bearings 151 mounted on the standard S' carrying the shaft 13, the shaft 150 having a bevelled gear 152 fixed at one end of the shaft meshing with a bevelled gear 153 fixed on the drive shaft 13. The opposite lower end of shaft 150 is arranged with a pinion 154 meshing with a gear 155 fixed on a stud shaft 156 rotatably mounted in a vertically extending boss 157 of the standard S' and having fixed thereon a pinion 158 meshing with a gear wheel 159 fixed on an end portion of the shaft 130 extending below the bearing 131. The rotation of the table 129 is imparted to the table 29 through a gear wheel 160 fixed on an end portion of the shaft 31 of the table 29 extending below the bearing 32 and said gear wheel 160 meshing with the gear wheel 159 connected to the table 129 through the shaft 130. Rotation is imparted to the disk 20 by the gear wheel 159 through a pinion 161 rotatably mounted on a stub shaft 162 supported from the underface of the table T and said pinion 161 meshing with the gear wheel 159 and a gear 163 fixed on the shaft 21 of the disk 20, as shown in Figures 1, 2 and 10.

It is to be understood that the recesses 104 are of such size and the table 29 is rotated at such speed that the sealing pads may be entirely supported by the recesses 104 without the use of the plate 109.

Having thus described my invention, I claim:

1. In apparatus for assembling sealing pads in closure caps, a conveyor arranged to support and transport closure caps and sealing pads in alined relation to each other, a fixed supporting surface interposed between the travel of the closure caps and sealing pads on the conveyor, means to place closure caps on the conveyor, and means to deposit sealing pads on the supporting surface to be transported by the conveyor, comprising a sealing pad supply tube mounted perpendicularly of the conveyer with the lower end spaced therefrom, a pair of bell crank levers pivotally mounted in a plane parallel to and above the conveyer and having an arm of each lever connected to each other, blade members mounted on the other arms of said levers to extend in a plane between the lower end of the supply tube and the conveyor, elastic means connected to the connection between the levers and adapted to yieldingly urge the blade members toward the center of the supply tube to hold the lowermost sealing pad in the supply tube, and a slide mounted adjacent the conveyer to have movement toward and away from closure caps on the conveyer and connected to a lever of the pair of levers and normally positioned by the elastic means through the lever in the path of travel of the closure caps, contact of the closure caps with the slide actuating the blade members from the center of the supply tube and out of line with the lowermost sealing pad therein against the force of the elastic means to permit depositing by gravity of the sealing pads on the supporting surface to be transported by the conveyer.

2. In apparatus for assembling sealing pads in closure caps, a circular table rotatably mounted and arranged with a series of arcuate recesses around the periphery thereof to support closure caps therein and another series of arcuate recesses in superposed alinement with and spaced from the closure cap supporting recesses less than the thickness of the sealing pads for the engagement of said sealing pads therein, a supporting surface extended into the space between the closure cap supporting recesses and sealing pad engaging recesses, means to place closure caps in the recesses therefor in the table, a tube for supporting sealing pads in stack formation mounted above a peripheral portion of the table and in alinement with the outer end portions of the sealing pad engaging recesses and the supporting surface whereby the outer end portions of said recesses will come into contact with the sealing pads deposited by the tube onto the supporting surface and move said sealing pads along said surface from the tube by the rotation of the table, means to transfer the sealing pads from the recesses therefor in the table and assemble said sealing pads in the closure caps in the recesses therefor in the table, and a rail mounted relative to the path of travel of the sealing pads from the tube to the sealing pad transferring and assembling means and extending in the plane of the sealing pad supporting recesses and in an arc intersecting the arc of the table whereby the sealing pads are progressively moved horizontally and positioned fully in the sealing pad engaging recesses while traveling from the tube to the sealing pad transferring and assembling means.

3. In apparatus for assembling sealing pads in closure caps, a circular table rotatably mounted and having an annular series of closure cap supporting seats around the periphery thereof and an annular series of sealing pad engaging recesses in superposed alinement with and spaced from the closure cap supporting seats a distance less than the thickness of the sealing pads, means to place closure caps in the supporting seats therefor, means to deposit sealing pads in the recesses therefor, means to assemble the sealing pads in alined closure caps on the table and remove the assembled closure caps from said table, a plate in the space between the closure cap supporting seats and sealing pad engaging recesses and having one end in alinement with the sealing pad depositing means to support the sealing pads deposited in the recesses and the opposite end terminating adjacent to the sealing pad assembling means to support the pads in their travel from the depositing means to the assembling means, and means to continuously rotate the table and continuously actuate the closure cap placing means and sealing pad assembling and closure cap removing means.

4. In apparatus for assembling sealing pads in closure caps, a circular table rotatably mounted and having an annular series of closure cap supporting seats around the periphery thereof and an annular series of sealing pad engaging recesses in superposed alinement with and spaced from the closure cap supporting seats a distance less than the thickness of the sealing pads, a second table rotatably mounted with a peripheral portion thereof extending below the closure cap supporting seats and sealing pad recesses at a peripheral portion of the first table, means to place closure caps in the supporting seats therefor on the first table, means to deposit sealing pads in the recesses therefor on the first table, a plate in the space between the closure cap supporting seats and sealing pad engaging recesses to support the sealing pads deposited in said recesses, and means carried by the second table relative to the peripheral portion thereof adapted to engage and position the sealing pads into alined closure caps on the first table at the point of intersection of the tables and subsequently remove the assembled closure caps from the first table to the peripheral portion of the second table.

5. In apparatus for assembling sealing pads in closure caps, a rotatable table, a series of arcuate plates having a series of arcuate recesses in the peripheries thereof mounted on the periphery of the table to form a circumferential series of closure cap supporting seats around said table, a second series of arcuate plates having a series of arcuate recesses in the peripheries thereof mounted on the peripheries of the first series of plates with the recesses of the second series of plates in alinement with and spaced from the recesses of the first series of plates a distance less than the thickness of the sealing pads to form a circumferential series of sealing pad engaging and transferring means around the table, and a fixed plate having a portion extending into the space between the first and second series of plates for a predetermined length of travel of the table.

6. In apparatus for assembling sealing pads in closure caps, a circular table rotatably mounted and arranged with a series of closure cap supporting seats around the periphery thereof and a series of sealing pad engaging recesses in superposed alinement with and spaced from the closure cap supporting seats a distance less than the thickness of the sealing pads, a second circular table having an annular recess in the periphery thereof and rotatably mounted with the peripheral recess intersecting the closure cap supporting seats and sealing pad recesses at a peripheral portion of the first table, and a wall of said recess positioned below the closure cap supporting seats to engage the closure caps being supported by said seats, means to rotate the tables in opposite directions, means mounted at a peripheral portion of the first table succeeding the point of intersection of the tables and adapted to feed and position closure caps in the supporting seats therefor of the first table, means mounted at a peripheral portion of the first table preceding the point of intersection of the tables adapted to deposit sealing pads in the recesses therefor of the first table, a member interposed between the closure cap supporting seats and sealing pad engaging recesses and extending between the sealing pad depositing means and the point of intersection of the tables, and means carried by the second table and slidable in openings in the wall of the annular recess opposite the wall engaging the closure caps to engage and position sealing pads in alined closure caps on the first table at the point of intersection of the tables and impinge the assembled closure caps to the wall of the recess of the second table to effect transfer of said assembled closure caps from the first table to the recess of the second table by the rotation of the tables.

7. In apparatus for assembling sealing pads in closure caps, a circular table rotatably mounted and arranged with a series of closure cap supporting seats around the periphery thereof and a series of sealing pad engaging recesses in superposed alinement with and spaced from the closure cap supporting seats a distance less than the thickness of the sealing pads, a fixed plate extending between the closure cap supporting seats and sealing pad engaging recesses, means to place closure caps in the supporting seats therefor of the table, and means to deposit sealing pads in the recesses therefor of the table and upon the fixed plate, comprising a tubular member mounted above the table relative to the sealing pad engaging recesses and the plate adapted to support sealing pads in stack formation with the lowermost sealing pad adapted to enter a recess therefor by gravity and be supported by the plate, and a pair of fingers yieldingly urged to normally support the lowermost sealing pad in the tubular member and prevent depositing of said sealing pad into the recess and upon the plate and arranged to be actuated solely by closure caps supported in the seats therefor of the table to position the fingers out of normal engagement with the lowermost sealing pad and permit the sealing pad to enter the recesses therefor and be supported by the plate.

8. In apparatus for assembling sealing pads in closure caps, a circular table rotatably mounted and arranged with a series of closure cap supporting seats around the periphery thereof and a series of sealing pad engaging recesses in superposed alinement with the closure cap supporting seats, a fixed plate extending between the closure cap seats and sealing pad recesses, means to place closure caps in the supporting seats therefor, and means to deposit sealing pads in the recesses therefor and upon the plate, comprising a tubular member mounted above the table relative to the travel of the sealing pad recesses with the lower end spaced from the recesses and adapted to support sealing pads in stack formation, a pair of blade members mounted to have movement between the table and the lower end of the tubular member and yieldingly urged toward the center of the tubular member to normally support the lowermost sealing pad in said member and prevent the depositing of said pad in a sealing pad recess and upon the plate, and means mounted to have movement in the plane of the table toward and away from the travel of closure caps in the supporting seats therefor and connected to and positioned by the blade members to strike the closure caps, the contact of said means by the closure caps moving the blade members from each other and positioning the blade members from the lower end of the tubular member to permit depositing of sealing pads in the recesses therefor and upon the plate by gravity.

9. In apparatus for assembling sealing pads in closure caps, a conveyer having a series of closure cap supporting seats and a series of sealing pad engaging recesses in superposed alinement with and spaced from the closure cap supporting seats, means to place closure caps in the seats therefor, means to deposit sealing pads in the recesses therefor, means to position sealing pads in alined closure caps in the conveyer seats, and a plate mounted to extend between the closure cap supporting seats and sealing pad recesses and of a length to have one end portion below the means to deposit sealing pads in the recesses therefor and have the opposite end portion terminating adjacent the means to position sealing pads in the closure caps to maintain the sealing pads in the recesses therefor and separate from the closure caps.

10. In means for assembling sealing pads in closure caps, a circular table rotatably mounted and arranged with a series of closure cap supporting seats around the periphery thereof and a series of sealing pad engaging recesses in superposed alinement with the closure cap supporting seats, a second table rotatably mounted with a peripheral portion thereof extending below and intersecting the closure cap supporting seats and sealing pad recesses at a peripheral portion of the first table, means to place closure caps in the supporting seats therefor, means to deposit sealing pads in the recesses therefor, means carried by the second table to transfer and position sealing pads in alined closure caps on the first table at the point of intersection of the tables and subsequently transfer the assembled closure caps from the first table to the second table and apply pressure to said closure caps, a rail extending along the periphery of the first table from the sealing pad depositing means to adjacent the point of intersection of the tables, said rail moving the sealing pads horizontally into the recesses therefor in alinement with the closure caps supported by the first table, and a plate mounted to extend between the closure cap supporting seats and sealing pad recesses and of a length to have one end portion below the sealing pad depositing means and the opposite end portion terminating adjacent the point of intersection of the tables to maintain the sealing pads in the recesses therefor separate from the closure caps.

11. In apparatus for assembling sealing pads in closure caps, a circular table rotatably mounted and arranged with a series of closure cap supporting seats around the periphery thereof and a series of sealing pad engaging recesses in superposed alinement with and spaced from the closure cap supporting seats a distance less than the thickness of the sealing pads, a second circular table having an annular recess in the periphery thereof and rotatably mounted with the peripheral recess intersecting the closure cap supporting seats and sealing pad recesses at a peripheral portion of the first table and a wall of said recess positioned below the closure cap supporting seats to engage the closure caps being supported by said seats, means to rotate the tables in opposite directions, means mounted at a peripheral portion of the first table succeeding the point of intersection of the tables and adapted to feed and position closure caps in the supporting seats therefor of the first table, means mounted at a peripheral portion of the first table preceding the point of intersection of the tables adapted to deposit sealing pads in the recesses therefor of the first table, means interposed between the closure cap supporting seats and sealing pad engaging recesses and extending between the sealing pad depositing means and the point of intersection of the tables to support sealing pads deposited in the recesses, a rail extending relative to the periphery of the first table from the sealing pad depositing means to adjacent the point of intersection of the tables adapted to move the sealing pads horizontally into the recesses therefor and position the sealing pads in alinement with the closure caps supported by the first table preceding the point of intersection of the tables, and means carried by the second table and slidable in openings in the wall of the annular recess opposite the wall engaging the closure caps to engage and position sealing pads in alined closure caps on the first table at the point of intersection of the tables and impinge the assembled closure caps to the wall of the recess of the second table to effect transfer of said assembled closure caps from the first table to the recess of the second table by the rotation of the tables.

12. In apparatus for assembling sealing pads in closure caps, a conveyer arranged with means to support and transport closure caps and transport sealing pads in alined relation to each other, a fixed member interposed between the closure cap supporting and transporting means and the sealing pad transporting means, and means to deposit sealing pads in the transporting means therefor of the conveyer and upon the fixed member, comprising a tubular member mounted to extend above the conveyer relative to the sealing pad transporting means thereof and adapted to support sealing pads in stack formation, and means yieldingly urged to support the lowermost sealing pad in the tubular member and prevent depositing of said sealing pad on the fixed member and said means adapted to be actuated solely by engagement of closure caps supported by the conveyer traveling relative to the tubular member to release the lowermost sealing pad from the tubular member and permit depositing of said sealing pad on the fixed member in engagement with the transporting means of the conveyer.

13. In apparatus for assembling sealing pads in closure caps, a circular table rotatably mounted and arranged with a series of closure caps supporting seats around the periphery thereof and a series of sealing pad engaging recesses in superposed alinement with and spaced from the closure cap supporting seats a distance less than the thickness of the sealing pads, a fixed plate extending between the closure cap supporting seats and sealing pad engaging recesses, means to place closure caps in the supporting seats therefor of the table, and means to deposit sealing pads in the recesses therefor of the table and upon the fixed plate, comprising a tubular member mounted above the table relative to the sealing pad engaging recesses and the plate with the lower end of the tubular member spaced from the recesses and said tubular member adapted to support sealing pads in stack formation with the lowermost sealing pad adapted to enter a recess therefor by gravity and be supported by the plate, and a pair of fingers pivotally mounted to travel in a plane between the lower end of the tubular member and the sealing pad recesses and have movement toward and away from the axis of the tubular member and yieldingly urged to normally support diametrically opposite portions of the lowermost sealing pad in the tubular member and prevent depositing of said sealing pad into the recess and upon the plate, and said fingers being arranged to be actuated solely by closure caps supported in the seats therefor of the table to position the fingers out of normal engagement with the lowermost sealing pad and permit the sealing pad to enter the recess therefor and be supported by the plate.

14. In apparatus for assembling sealing pads in closure caps, a circular table rotatably mounted and arranged with a series of closure cap supporting seats around the periphery thereof and a series of sealing pad engaging recesses in superposed alinement with the closure cap supporting seats, a fixed plate extending between the closure cap seats and sealing pad recesses, means to place closure caps in the supporting seats thereof, and means to deposit sealing pads in the recesses therefor and upon the plate, comprising a tubular member mounted above the table relative to the travel of the sealing pad recesses with the lower end spaced from the recesses and adapted to support sealing pads in stack formation, a pair of blade members mounted to have movement between the table and the lower end of the tubular member and yieldingly urged toward the center of the tubular member to normally support the lowermost sealing pad in said member and prevent the depositing of said pad in a sealing pad recess and upon the plate, and a slide mounted to have movement in the plane of the table toward and away from the travel of closure caps in the supporting seats therefor and connected to and positioned by the blade members to strike the closure caps, the contact of said slide by the closure caps moving the blade members from each other and positioning the blade members from the lower end of the tubular member to permit depositing of sealing pads in the recesses therefor and upon the plate by gravity.

15. In apparatus for assembling sealing pads in closure caps, a circular table rotatably mounted and having a series of closure cap supporting seats around the periphery thereof and a series of sealing pad engaging recesses in superposed alinement with the closure cap supporting seats, a fixed plate interposed between the closure cap supporting seats and sealing pad engaging recesses, means to place closure caps in the supporting seats therefor, and means to deposit sealing pads in the recesses therefor and upon the plate, comprising a sealing pad supply tube mounted perpendicularly of the table with the lower end spaced from and relative to the sealing pad recesses, a pair of bell crank levers pivotally mounted in a plane parallel to and above the table having an arm of each lever connected to each other and the other arms being arranged with blade portions extending in a plane between the lower end of the supply tube and the sealing pad recesses, elastic means connected to the connection between the levers adapted to yieldingly urge the blade portions toward the center of the supply tube to hold the lowermost sealing pad in the supply tube and prevent depositing of said sealing pad in a recess therefor and upon the plate, and a slide mounted adjacent the periphery of the table to have movement toward and way from closure caps in the supporting seats therefor connected to a lever of the pair of levers and normally positioned by the elastic means through the lever in the path of travel of the closure caps, the contact of the closure caps with the slide actuating the blade portions from the center of the supply tube out of line with the lowermost sealing pad therein against the force of the elastic means to permit depositing by gravity of the sealing pads in the recesses therefor and upon the plate.

JOHN A. JOHNSON.